(12) United States Patent
Takei et al.

(10) Patent No.: US 7,537,837 B2
(45) Date of Patent: May 26, 2009

(54) HEAT CONDUCTIVE SILICONE RUBBER COMPOSITE SHEET

(75) Inventors: Hiroshi Takei, Usui-gun (JP); Akio Suzuki, Tano-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 233 days.

(21) Appl. No.: 10/667,671

(22) Filed: Sep. 23, 2003

(65) Prior Publication Data

US 2004/0067372 A1    Apr. 8, 2004

(30) Foreign Application Priority Data

Oct. 4, 2002    (JP)    ............................. 2002-292209

(51) Int. Cl.
*B32B 9/04*    (2006.01)
(52) U.S. Cl. .................... 428/447; 428/473.5; 428/480; 524/588; 528/24; 528/34
(58) Field of Classification Search ....................... None
See application file for complete search history.

(56) References Cited

U.S. PATENT DOCUMENTS

| | | | |
|---|---|---|---|
| 5,021,494 A * | 6/1991 | Toya | 524/404 |
| 5,652,290 A * | 7/1997 | Nakamura et al. | 524/437 |
| 5,741,579 A | 4/1998 | Nishizawa | |
| 5,948,515 A * | 9/1999 | Tsunekawa | 428/215 |
| 6,074,963 A * | 6/2000 | Okami et al. | 442/16 |

FOREIGN PATENT DOCUMENTS

| | | | |
|---|---|---|---|
| JP | 52-102678 | * | 2/1976 |
| JP | 56-167444 A | | 12/1981 |
| JP | 1-173514 | * | 7/1989 |
| JP | 02-097559 A | | 4/1990 |
| JP | 02-024383 B | | 5/1990 |
| JP | 10-237228 A | | 9/1998 |
| JP | 11-157011 A | | 5/1999 |
| JP | 2001-018330 A | | 1/2001 |

OTHER PUBLICATIONS

Japanese Official Action w/English Translation (Translation of Office Action mailed Aug. 14, 2006 Corresponding Japanese Patent Application 2002-292209.

* cited by examiner

*Primary Examiner*—Marc S Zimmer
(74) *Attorney, Agent, or Firm*—Oblon, Spivak, McClelland, Maier & Neustadt, P.C.

(57) ABSTRACT

The present invention provides a heat conductive silicone rubber composite sheet that is suitable as a heat dissipating member provided between a heat generating electronic component and a heat dissipating component such as a heat dissipating fin, wherein the heat conductive silicone rubber composite sheet has a laminated structure with good electrical insulation and thermal conductivity, as well as excellent strength, flexibility, and particularly superior interlayer adhesion. The laminated structure has an intermediate layer and a pair of outer layers laminated to both surfaces of the intermediate layer, wherein
   (A) the intermediate layer is a layer of a synthetic resin film that displays heat resistance and electrical insulation, and
   (B) the outer layers are silicone rubber layers formed by curing a composition including (a) an organopolysiloxane, (b) a curing agent, (c) a heat conductive filler, and (d) a silicon compound-based adhesion imparting agent with at least one functional group selected from the group consisting of epoxy groups, alkoxy groups, vinyl groups, and the group represented by the formula Si—H.

14 Claims, No Drawings

HEAT CONDUCTIVE SILICONE RUBBER COMPOSITE SHEET

BACKGROUND OF THE INVENTION

1. Field of the Invention

The present invention relates particularly to a heat conductive silicone rubber composite sheet that is suitable as a heat dissipating member provided between a heat generating electronic component and a heat dissipating component such as a heat dissipating fin, wherein the heat conductive silicone rubber composite sheet has good electrical insulation and thermal conductivity, and also has excellent strength and flexibility.

2. Description of the Prior Art

Conventionally, electrically insulating heat conductive materials are used as heat dissipating members for heat generating electronic and electrical components such as power transistors, MOS transistors, FETs, thyristors, rectifiers and transformers. Examples include materials produced by adding a metal oxide powder such as beryllium oxide, aluminum oxide, aluminum hydroxide, magnesium oxide or zinc oxide to a synthetic rubber such as silicone rubber (refer to Japanese Laid-open Patent publication (kokai) No. Sho 47-32400 (JP47-32400A)), and materials in which boron nitride is added to a silicone rubber and the rubber is reinforced with a network type insulating material (refer to Japanese Laid-open Utility Model publication (kokai) No. Sho 54-184074).

Furthermore, one method of further improving the thermal conductivity of the aforementioned heat dissipating member is by keeping the thickness of the member as thin as possible. However if the thickness is reduced too much, a problem arises in that the strength, durability, or electrical insulation of the heat dissipating member is lost. As a solution to this problem, multi-layered structures that utilize a film with excellent heat resistance, electrical insulation and mechanical strength, such as an aromatic polyimide, a polyamide, a polyamideimide, or a polyethylene naphthalate, as an intermediate layer, and a silicone rubber layer containing added beryllium oxide, aluminum oxide or aluminum hydroxide or the like, which provides excellent thermal conductivity and electrical characteristics, as an outer layer have been proposed, and for example, Japanese Post-Examination Patent publication (kokoku) No. Hei 2-24383 (JP2-24383B) discloses a heat conductive electrical insulation member with a laminated structure comprising at least three layers, comprising a polyimide(amide) film containing a predetermined quantity of aluminum oxide or the like as an intermediate layer, and silicone rubber layers containing added aluminum oxide or the like as a pair of outer layers disposed on both surfaces of the intermediate layer.

However, in these heat conductive electrical insulation members with multi-layered structures, the adhesion between the silicone rubber layers of the outer layers and the film of aromatic polyimide or the like of the intermediate layer is unstable, and over time, interlayer separation is likely, meaning the members suffer from durability problems.

SUMMARY OF THE INVENTION

The present invention takes the problems associated with the conventional technology into consideration, with an object of providing a heat conductive silicone rubber composite sheet with good electrical insulation and thermal conductivity, excellent strength and flexibility, and particularly superior interlayer adhesion.

In order to achieve the above object, the present invention provides:

a heat conductive silicone rubber composite sheet comprising a laminated structure with an intermediate layer and a pair of outer layers laminated to both surfaces of the intermediate layer, wherein (A) the intermediate layer is a layer of a synthetic resin film that displays heat resistance and electrical insulation, and (B) the outer layers are silicone rubber layers formed by curing a composition comprising (a) an organopolysiloxane, (b) a curing agent, (c) a heat conductive filler, and (d) a silicon compound-based adhesion imparting agent with at least one functional group selected from the group consisting of epoxy groups, alkoxy groups, vinyl groups, and the group represented by the formula Si—H.

A heat conductive silicone rubber composite sheet of the present invention not only comprises a heat conductive filler within the silicone rubber layer of the outer layers, thereby having good thermal conductivity, but also comprises a synthetic resin film with excellent electrical insulation and mechanical strength as an intermediate layer, and has satisfactory strength and flexibility as a result of the reinforcing effect, making the composite sheet suitable as an electrically insulating, heat dissipating member provided between a heat generating electronic or electrical component and a heat dissipating component. Moreover, because the composite sheet utilizes an adhesion imparting agent, a powerful adhesion between the silicone rubber layers and the synthetic resin film layer is also possible, meaning the composite sheet displays remarkable operations and effects with excellent durability.

DETAILED DESCRIPTION OF THE PREFERRED EMBODIMENTS

As follows is a detailed description of the present invention.

[(A) Intermediate Layer]

Provided an intermediate layer of a composite sheet of the present invention is a synthetic resin film with excellent heat resistance and electrical insulation, as well as good flexibility and mechanical strength, there are no particular restrictions on the layer, and any known material can be used.

The thickness of the synthetic resin film is typically within a range from 5 to 40 μm, and preferably from 10 to 30 μm. If the film is overly thick, it can impede the thermal conductivity of the composite sheet of the present invention, whereas in contrast if the film is too thin, then the strength exhibited by the intermediate layer can be insufficient, and the withstand voltage characteristics can deteriorate, causing the electrical insulation performance to be unsatisfactory.

Examples of the synthetic resin that acts as the raw material for the film used for the intermediate layer include films formed from aromatic polyimides, polyamides, polyamideimides, polyethylene naphthalate, and the like. Furthermore, films formed from polytetrafluoroethylene (PTFE) or copolymers of tetrafluoroethylene and a perfluoroalkylvinyl ether can also be used, although in the case of fluorine-based polymers, the film surface is preferably subjected to chemical etching treatment using a metallic sodium/naphthalene-based treatment liquid in order to improve the adhesion.

Provided these films have a melting point of at least 200° C., and preferably 250° C. or higher, they offer excellent heat resistance, with no deterioration in mechanical strength or thermal deformation, and are consequently ideal.

Preferred examples of the film include heat resistant films with melting points of at least 250° C., including aromatic polyimide-based films: Kapton (a brand name, manufactured by DuPont-Toray Co., Ltd.), Apical (a brand name, manufactured by Kaneka Corporation), Upilex (a brand name, manufactured by Ube Industries Ltd.); aromatic polyamide-based films: Aramika (a brand name, manufactured by Asahi Kasei Corporation); and polyethylene naphthalate-based films: Teonex (a brand name, manufactured by Teijin DuPont Films Ltd.), as well as heat resistant films with melting points of at least 300° C., including PTFE-based films in which both surfaces have been subjected to chemical etching treatment using a metallic sodium/naphthalene-based treatment liquid: Nitoflon 902UL (a brand name, manufactured by Nitto Denko Corporation).

[(B) Outer Layers]

Outer layers incorporated within a composite sheet of the present invention are silicone rubber layers formed by curing a composition comprising (a) an organopolysiloxane, (b) a curing agent, (c) a heat conductive filler, and (d) a silicon compound-based adhesion imparting agent with at least one functional group selected from the group consisting of epoxy groups, alkoxy groups, vinyl groups, and the group represented by the formula Si—H. There are no particular restrictions on the thickness of each of these (B) layers, which can be set in accordance with the form and purpose of the composite sheet of the present invention, although typical thickness values are within a range from 30 to 800 μm, and preferably from 50 to 400 μm. In general, if the layers are overly thin, then the ability of the layer to track the shape of an electronic component deteriorates and the thermal conductivity tends to worsen, whereas if the layers are overly thick, the heat transmission characteristics tend to deteriorate, and either case is undesirable.

<(a) Organopolysiloxane>

The organopolysiloxane of the component (a) is a material represented by an average composition formula $R_{1a}SiO_{(4-a)/2}$ (wherein, $R^1$ are each independently a substituted or unsubstituted monovalent hydrocarbon group of 1 to 10 carbon atoms, and preferably of 1 to 8 carbon atoms, which are the same or different, and a is a positive number of 1.90 to 2.05).

Examples of the $R^1$ group include alkyl groups such as methyl groups, ethyl groups, propyl groups, butyl groups, pentyl groups, hexyl groups, heptyl groups, octyl groups, nonyl groups, decyl groups, and octadecyl groups; cycloalkyl groups such as cyclopentyl groups and cyclohexyl groups; aryl groups such as phenyl groups, tolyl groups, xylyl groups, and naphthyl groups; aralkyl groups such as benzyl groups, phenethyl groups, and 3-phenylpropyl groups; halogenated alkyl groups such as 3,3,3-trifluoropropyl groups and 3-chloropropyl groups; and alkenyl groups such as vinyl groups, allyl groups, butenyl groups, pentenyl groups, and hexenyl groups.

Typically, it is preferable that this organopolysiloxane of the component (a) has a backbone chain that comprises dimethylsiloxane units, or a backbone chain that comprises dimethylsiloxane units but a portion of the methyl groups are substituted with a vinyl group, a phenyl group or a 3,3,3-trifluoropropyl group or the like. Furthermore, the molecular chain terminals of the backbone chain can be blocked with a triorganosilyl group or a hydroxyl group, with examples of the triorganosilyl group including trimethylsilyl groups, dimethylvinylsilyl groups and trivinylsilyl groups.

The degree of polymerization of the component (a) is typically within a range from 200 to 12,000, and preferably from 200 to 10,000, and the component may be either an oil or a gum, and can be selected in accordance with factors such as the molding method.

In those cases in which the curing agent of the component (b) described below is an addition reaction curing type material comprising an organohydrogenpolysiloxane and a platinum-based catalyst, the organopolysiloxane of the component (a) is an organopolysiloxane that contains at least 2, and preferably 3 or more, alkenyl groups bonded to silicon atoms within a single molecule. If the quantity of alkenyl groups bonded to silicon atoms falls below the above range, the produced composition will not cure satisfactorily. Furthermore, these alkenyl groups bonded to silicon atoms are preferably vinyl groups. The alkenyl groups may be present at the molecular chain terminals and/or in side chains, although at least one alkenyl group is preferably bonded to a silicon atom at a molecular chain terminal.

Specific examples of suitable materials include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, and dimethylpolysiloxane with both molecular chain terminals blocked with trivinylsiloxy groups. These materials can be used singularly, or in combinations of two or more materials.

In those cases in which the curing agent of the component (b) described below is an organic peroxide, there are no particular restrictions on the organopolysiloxane of the component (a), although materials with at least 2 of the aforementioned alkenyl groups within a single molecule are preferred.

Specific examples of suitable materials include polydimethylsiloxane with both molecular chain terminals blocked with dimethylvinylsiloxy groups, polydimethylsiloxane with both molecular chain terminals blocked with methylphenylvinylsiloxy groups, copolymers of dimethylsiloxane and methylphenylsiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane and methylvinylsiloxane with both molecular chain terminals blocked with trimethylsiloxy groups, polymethyl(3,3,3-trifluoropropyl)siloxane with both molecular chain terminals blocked with dimethylvinylsiloxy groups, copolymers of dimethylsiloxane and methylvinylsiloxane with both molecular chain terminals blocked with silanol groups, and copolymers of dimethylsiloxane, methylvinylsiloxane and methylphenylsiloxane with both molecular chain terminals blocked with silanol groups. These materials can be used singularly, or in combinations of two or more materials.

<(b) Curing Agent>

In those cases in which the component (b) is a hydrosilylation reaction curing agent, the curing agent comprises an organohydrogenpolysiloxane with an average of at least 2 hydrogen atoms bonded to silicon atoms within a single molecule, and a platinum catalyst. The organohydrogenpolysiloxane functions as a cross linking agent that undergoes an addition reaction with the alkenyl group-containing component (a).

Specific examples of this organohydrogenpolysiloxane include methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of dimethylsiloxane, methylhydrogensiloxane and methylphenylsiloxane with both molecular chain terminals blocked with trimethylsiloxy groups, dimethylpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups, copolymers of dimethylsiloxane and methylphenylsiloxane with both molecular chain terminals blocked with dimethylhydrogensiloxy groups, and methylphenylpolysiloxane with both molecular chain terminals blocked with dimethylhydrogensiloxy groups. These materials can be used singularly, or in combinations of two or more materials.

In a composition for forming an outer layer of a composite sheet of the present invention, the quantity of this organohydrogenpolysiloxane is a quantity such that the quantity of hydrogen atoms bonded to silicon atoms within the component (b) is typically from 0.1 to 4.0 mols, and preferably from 0.3 to 2.0 mols, per 1 mol of alkenyl groups bonded to silicon atoms within the component (a). If the quantity of this component is too small, then the obtained silicone rubber composition may not cure satisfactorily, whereas in contrast, if the quantity is too large, the obtained silicone rubber composition is extremely hard, and may develop a plurality of cracks on the surface.

The platinum-based catalyst that is used together with the organohydrogenpolysiloxane is a catalyst for promoting the curing of the composition, and suitable examples include chloroplatinic acid, alcohol solutions of chloroplatinic acid, olefin complexes of platinum, alkenylsiloxane complexes of platinum, and carbonyl complexes of platinum. There are no particular restrictions on the quantity of the platinum-based catalyst used in the composition, which need only be an effective catalytic quantity, although a typical quantity is a quantity such that the quantity of the platinum metal within the component (b) relative to the quantity of the component (a) is within a range from 0.01 to 1,000 ppm (by weight), and preferably from 0.1 to 500 ppm (by weight). If the quantity of the catalyst within the composition is too low, then the obtained silicone rubber composition may not cure satisfactorily, whereas in contrast, adding a large quantity causes no further improvement in the curing rate of the silicone rubber composition, and may be economically disadvantageous.

In those cases in which the component (b) is an organic peroxide, suitable examples of the organic peroxide include benzoyl peroxide, dicumyl peroxide, 2,5-dimethyl-2,5-bis(t-butylperoxy)hexane, di-t-butyl peroxide and t-butylperbenzoate. These compounds may be used either singularly, or in combinations of two or more compounds. Preferably, the quantity added of this organic peroxide is typically within a range from 0.1 to 5 parts by weight per 100 parts by weight of the organopolysiloxane of the aforementioned component (a).

<(c) Heat Conductive Filler>

Examples of suitable heat conductive fillers of the component (c) include inorganic powders such as aluminum oxide, zinc oxide, silicon oxide, silicon carbide, aluminum nitride, and boron nitride. These compounds can be used singularly, or in combinations of two or more compounds.

The average particle diameter of this component (c) is typically no more than 50 μm, and preferably no more than 20 μm.

Furthermore, the quantity added of this component (c) is typically within a range from 100 to 1,800 parts by weight, and preferably from 200 to 1,600 parts by weight, per 100 parts by weight of the component (a). If the quantity added is too small, the thermal conductivity of the outer layer becomes unsatisfactory, whereas if the quantity is too large, then combining the component (c) uniformly within the composition becomes difficult, and the molding workability deteriorates.

<(d) Silicon Compound-Based Adhesion Imparting Agent>

The component (d) is an important component in characterizing a heat conductive silicone rubber composite sheet of the present invention, and by adding this component to the silicone rubber composition that forms the outer layers, the synthetic resin film of the intermediate layer (A) and the silicone rubber layers of the outer layers (B) show a powerful mutual adhesion, which displays excellent durability over extended periods, with no interlayer separation. Furthermore, because primer treatment of the synthetic resin film of the intermediate layer (A), aimed at improving the adhesion, can be omitted, the production process of the composite sheet can be simplified, and because of the absence of a primer layer, a composite sheet with no reduction in thermal conductivity can be obtained.

The silicon compound-based adhesion imparting agent of the component (d) must be a silicon compound with at least one functional group selected from the group consisting of epoxy groups, alkoxy groups, vinyl groups, and the group represented by the formula Si—H. Silicon compounds with at least 2 functional groups which are each selected from the group consisting of epoxy groups, alkoxy groups, vinyl groups, and the group represented by the formula Si—H are particularly preferred.

The quantity added of this component (d) is typically within a range from 0.1 to 3.0 parts by weight, and preferably from 0.5 to 2.0 parts by weight, per 100 parts by weight of the component (a). If the quantity added is too small, then an adhesion imparting effect is not exhibited, whereas if the quantity is too large, an undesirable loss in mechanical characteristics occurs.

Specific examples of silicon compounds with these types of functional groups include the compounds shown below. However, these silicon compounds are not restricted to the compounds shown below.

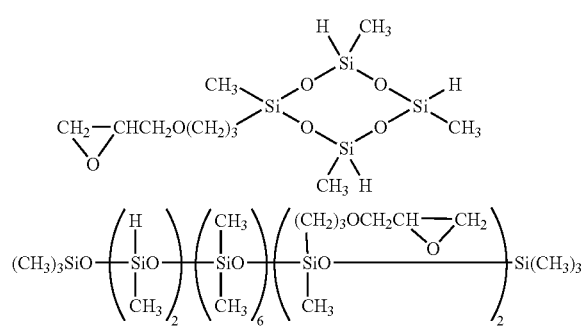

-continued

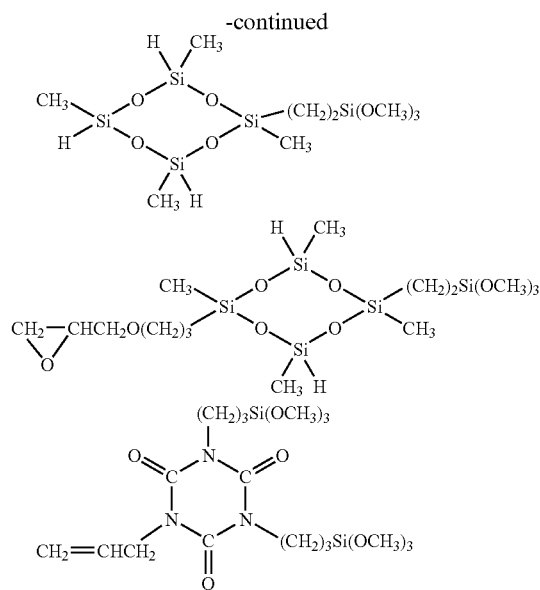

These compounds can be used either singularly, or in combinations of two or more compounds.

[Production of a Heat Conductive Composite Sheet]

<Preparation of a Coating Composition for the Outer Layers (B)>

First, the organopolysiloxane of the aforementioned component (a) and the heat conductive filler of the component (c) are kneaded together using a mixing device such as a kneader, a Banbury mixer, a planetary mixer or a Shinagawa mixer, if necessary with heating to a temperature of approximately 100° C. or higher. During this kneading process, if desired, reinforcing silica such as fumed silica or precipitated silica; silicone oil or silicone wetter, or flame retardants such as platinum, titanium oxide or benzotriazole may also be added and mixed, provided such addition does not impair the heat conducting performance of the outer layer.

The uniform mixture obtained from the kneading process is cooled to room temperature, filtered through a strainer or the like, and subsequently, predetermined quantities of the adhesion imparting agent of the component (d) and the curing agent of the component (b) are added to the mixture, and a second kneading is conducted using a twin-roll mill or a Shinagawa mixer or the like. During this second kneading process, if desired, acetylene compound-based addition reaction control agents such as 1-ethynyl-1-cyclohexanol, colorants such as organic pigments or inorganic pigments, or heat resistance improvement agents such as iron oxide or cerium oxide may also be added and mixed.

The outer layer composition obtained from this second kneading process can be supplied directly to the next process as the outer layer coating agent, or furthermore, if necessary, a solvent such as toluene can be added, and the mixture placed in a mixing device such as a planetary mixer or a kneader, and mixed to form the outer layer coating agent.

<Coating Process>

The outer layer coating agent obtained from the process described above is applied sequentially to both surfaces of the synthetic resin film of the aforementioned intermediate layer (A), in a continuous manner and at a predetermined thickness, using a coating apparatus such as a knife coater or a kiss coater equipped with a drying furnace, a heating furnace and a winding device, and subsequently, the solvent is dried and evaporated, and by then heating the coating, either at 80 to 200° C. and preferably 100 to 150° C. in the case of an addition reaction curing type composition, or at 100 to 200° C. and preferably 110 to 180° C. in the case of a peroxide curing type composition, to effect cross linking and curing of the coating, a heat conductive silicone rubber composite sheet of the present invention with excellent thermal conductivity, electrical insulation, mechanical strength, flexibility, heat resistance, and durability can be obtained.

A heat conductive silicone rubber composite sheet of the present invention is not restricted to laminated structures of three layers, and if desired, the layer (A) and the layer (B) described above can be combined in a (B)/(A)/(B)/(A)/(B) type 5 layer laminated structure, or a separate layer of glass cloth, a graphite sheet or aluminum foil could also be included.

EXAMPLES

As follows is a more specific description of the present invention, which presents a series of examples and comparative examples, although the present invention is not restricted to the examples presented below.

Example 1

(a) 100 parts by weight of a dimethylpolysiloxane, with both molecular chain terminals blocked with dimethylvinylsiloxy groups and with an average degree of polymerization of 8,000, and (c) 750 parts by weight of an aluminum oxide powder with an average particle diameter of 4 μm: AL-24 (a brand name, manufactured by Showa Denko K. K.) as a heat conductive filler were kneaded for 40 minutes at room temperature in a Banbury mixer, and following subsequent filtering through a 100 mesh strainer, (d) 1.0 parts by weight of a functional group containing silicon compound represented by a structural formula shown below:

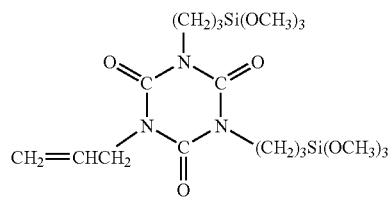

as an adhesion imparting agent, (b) 1.9 parts by weight of di(2-methylbenzoyl) peroxide as an organic peroxide, and 0.4 parts by weight of KE-color-R20 (brand name, manufactured by Shin-Etsu Chemical Co., Ltd.) as a colorant were added to 100 parts by weight of the mixture of (a) and (c), and further kneading was performed with a twin-roll mill, yielding a mixture.

Subsequently, 100 parts by weight of the thus obtained mixture was dissolved in 47 parts by weight of toluene to prepare a coating agent, and this coating agent was first applied to one surface of an aromatic polyimide-based film (brand name: Kapton 100H, manufactured by DuPont-Toray Co., Ltd., thickness: 25 μm) with a coating apparatus, using a line speed of 3.0 m/min., and was then treated under conditions including a drying temperature of 80° C. and a curing temperature of 150° C. to form a rubber layer with a thickness of 62.5 μm. Subsequently, the other surface was coated, dried, and cured in a similar manner, yielding a heat conductive silicone rubber composite sheet with an overall thickness of 150 μm.

Comparative Example 1

With the exception of not using the silicon compound of the component (d) described above, a heat conductive silicone rubber composite sheet with an overall thickness of 150 μm was prepared in the same manner as the example 1.

Example 2

With the exception of altering the quantity of the silicon compound of the component (d) used in the example 1 from 1.0 parts by weight to 0.5 parts by weight, a heat conductive silicone rubber composite sheet was prepared in the same manner as the example 1.

Example 3

With the exception of using a polyethylene naphthalate-based film (brand name: Teonex, manufactured by Teijin DuPont Films Ltd., thickness: 25 μm) instead of the aromatic polyimide-based film (brand name: Kapton 100H, manufactured by DuPont-Toray Co., Ltd., thickness: 25 μm), a heat conductive silicone rubber composite sheet was prepared in the same manner as the example 1.

Example 4

(a) 100 parts by weight of a dimethylpolysiloxane, with both molecular chain terminals blocked with dimethylvinylsiloxy groups and with a viscosity at 25° C. of 600 mm²/s (600 cSt), together with (c1) 280 parts by weight of an aluminum oxide powder with an average particle diameter of 4 μm: AL-24 (a brand name, manufactured by Showa Denko K. K.) and (c2) 420 parts by weight of a spherical aluminum oxide powder with an average particle diameter of 16 μm: AS-30 (a brand name, manufactured by Showa Denko K. K.) as heat conductive fillers were kneaded for 20 minutes at room temperature in a planetary mixer, and following subsequent filtering through a 100 mesh strainer, (d) 1.0 parts by weight of a functional group containing silicon compound represented by a structural formula shown below:

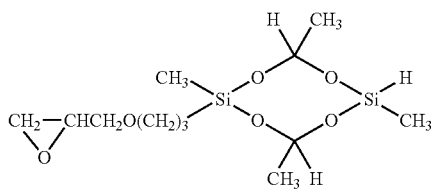

as an adhesion imparting agent, and (b1) 0.35 parts by weight of a vinylsiloxane complex of chloroplatinic acid (platinum metal content: 1% by weight) were mixed uniformly with 100 parts by weight of the mixture containing (a)+(c1)+(c2), and subsequently, 0.06 parts by weight of 1-ethynyl-1-cyclohexanol was added as an addition reaction control agent, and then (b2) 1.5 parts by weight of a methylhydrogenpolysiloxane (Si—H content: 0.0050 mol/g) represented by a structural formula shown below (Si—H/vinyl groups within (a) (molar ratio): 4.0) was mixed in uniformly to prepare a silicone rubber composition.

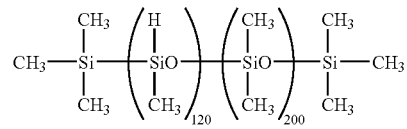

Subsequently, the mixture obtained above was used as a coating agent, and this coating agent was first applied to one surface of a PTFE-based film that had been chemically etched on both surfaces: Nitoflon 902UL (a brand name, manufactured by Nitto Denko Corporation, thickness: 25 μm) with a coating apparatus, using a line speed of 3.0 m/min., and was then treated under conditions including a curing temperature of 180° C. to form a rubber layer with a thickness of 62.5 μm, and subsequently, the other surface was coated and cured in a similar manner, yielding a heat conductive silicone rubber composite sheet with an overall thickness of 150 μm.

Table 1 shows the compositions containing a component (a) and a component (c), and the composition of the coating agents, for the examples 1 to 4 and the comparative example 1. In Table 1, the numbers all refer to parts by weight values.

[Evaluation of Various Characteristics]

Using the techniques described below, various characteristics of each of the composite sheets prepared in the examples 1 to 4 and the comparative example 1 were measured, and the results of these measurements are shown in Table 1.

[General Characteristics]

Tensile Strength (MPa), Tear Strength (kN/m), and Breakdown Voltage (kV) Were Measured in Accordance with JIS K6249.

Withstand Voltage (kV)

Measured in accordance with JIS C 2110.

Adhesive Strength (N/cm)

In accordance with JIS K 6259, by conducting a 180° peel test, the adhesive strength was measured. A two layered structure was prepared as the test piece, with a layer formed from an outer layer material of thickness 1 mm produced on one surface of a film of thickness 25 μm.

[Heat Characteristics]

Heat Resistance (°C./W)

A sample was sandwiched between a heat sink (a heat dissipating component) and a TO-3P type transistor (contact surface area: approximately 2.7 cm²), and after securing with a screw of diameter 3.0 mm (screw pressure: 49.0±9.8 N (5±1 Kgf)), power (10 W) was applied to the transistor. After 10 minutes, the temperature of the transistor ($T_1$) and the temperature of the heat sink ($T_2$) were measured, and the heat resistance was calculated using the following formula.

$$\text{Heat Resistance } (°C./W) = (T_1 - T_2)/10$$

TABLE 1

|  |  | Example 1 | Example 2 | Example 3 | Example 4 | Comparative example 1 |
|---|---|---|---|---|---|---|
| Intermediate layer | | polyimide-based | polyimide-based | polyester-based | PTFE-based | polyimide-based |
| Mixture (a) + (c) | (a) organopolysiloxane | 100 | 100 | 100 | 100 | 100 |
| | (c) heat conductive filler | 750 | 750 | 750 | 700 | 750 |
| Coating agent | (a) + (c) | 100 | 100 | 100 | 100 | 100 |
| | (d) adhesion imparting agent | 1.0 | 0.5 | 1.0 | 1.0 | — |
| | (b) curing agent | 1.9 | 1.9 | 1.9 | 1.5* | 1.9 |
| | Colorant | 0.4 | 0.4 | 0.4 | — | 0.4 |
| Characteristics | thickness (μm) | 150 | 150 | 150 | 150 | 150 |
| | tensile strength (MPa) | 46 | 45 | 51 | 48 | 45 |
| | tear strength (kN/m) | 60 | 60 | 84 | 65 | 60 |
| | withstand voltage (kV) | 9.5 | 9.9 | 9.5 | 9.8 | 9.0 |
| | Breakdown voltage (kV) | 12 | 13 | 12 | 12 | 11 |
| | adhesive strength (N/cm) | 39.2 (rupture) | 36.3 (rupture) | 41.2 (rupture) | 40.2 (rupture) | 7.8 (peeled) |
| | heat resistance (° C./W) | 0.64 | 0.65 | 0.65 | 0.65 | 0.66 |

(*Note:
The quantity of the curing agent (b) in the example 4 is the quantity of added methylhydrogenpolysiloxane.)

What is claimed is:

1. A heat conductive silicone rubber composite sheets comprising;
    a laminated structure with an intermediate layer and a pair of outer layers laminated to both surfaces of said intermediate layer, wherein
    (A) said intermediate layer is a layer of a synthetic resin film that displays heat resistance and electrical insulation and said intermediate layer has no pores of at least 0.3 mm in diameter, and
    (B) said outer layers are silicone rubber layers formed by curing a composition comprising (a) an organopolysiloxane, (b) a curing agent, (c) a heat conductive filler, and (d) a silicon compound-based adhesion imparting agent with at least one functional group selected from the group consisting of epoxy groups, alkoxy groups, vinyl groups, and the group represented by the formula Si—H;
    wherein said curing agent of said component (b) is an organic peroxide; and
    wherein said synthetic resin comprises an aromatic polyimide or a polyethylene naphthalate.

2. The heat conductive silicone rubber composite sheet according to claim 1, wherein the thickness of said synthetic resin film is within a range from 5 to 40 μm.

3. The heat conductive silicone rubber composite sheet according to claim 1, wherein said synthetic resin film has a melting point of 200° C. or higher.

4. The heat conductive silicone rubber composite sheet according to claim 1, wherein the thickness of each of said outer layers is within a range from 30 to 800 μm.

5. The heat conductive silicone rubber composite sheet according to claim 1, wherein said organopolysiloxane of said component (a) is represented by an average composition formula $R^1_a SiO_{(4-a)/2}$ (wherein, $R^1$ are each independently a substituted or unsubstituted monovalent hydrocarbon group of 1 to 10 carbon atoms, which are the same or different, and a is a positive number of 1.90 to 2.05).

6. The heat conductive silicone rubber composite sheet according to claim 1, wherein said organopolysiloxane of said component (a) has a backbone chain that comprises dimethylsiloxane units, or a backbone chain that comprises dimethylsiloxane units but a portion of the methyl groups are substituted with a vinyl group, a phenyl group, or a 3,3,3-trifluoropropyl group, and the molecular chain terminals of the backbone chain are blocked with a triorganosilyl group or a hydroxyl group.

7. The heat conductive silicone rubber composite sheet according to claim 1, wherein the degree of polymerization of said component (a) is within a range from 200 to 12,000.

8. The heat conductive silicone rubber composite sheet according to claim 1, wherein the quantity of said organic peroxide is within a range from 0.1 to 5 parts by weight per 100 parts by weight of said organopolysiloxane of said component (a).

9. The heat conductive silicone rubber composite sheet according to claim 1, wherein said heat conductive filler of said component (c) comprises an inorganic powder.

10. The heat conductive silicone rubber composite sheet according to claim 1, wherein the average particle diameter of said component (c) is no more than 50 μm.

11. The heat conductive silicone rubber composite sheet according to claim 1, wherein the quantity of said heat conductive filler of said component (c) is within a range from 100 to 1,800 parts by weight per 100 parts by weight of said organopolysiloxane of said component (a).

12. The heat conductive silicone rubber composite sheet according to claim 1, wherein said silicon compound-based adhesion imparting agent of said component (d) has at least 2 functional groups which are each selected from the group consisting of epoxy groups, alkoxy groups, vinyl groups, and the group represented by the formula Si—H.

13. The heat conductive silicone rubber composite sheet according to claim 1, wherein the quantity of said component (d) is within a range from 0.1 to 3.0 parts by weight per 100 parts by weight of said component (a).

14. The heat conductive silicone rubber composite sheet according to claim 1, wherein said component (d) comprises at least one compound selected from the group consisting of:

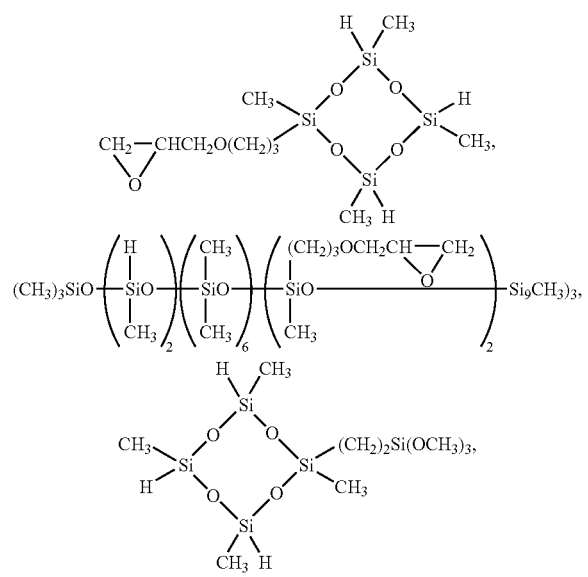
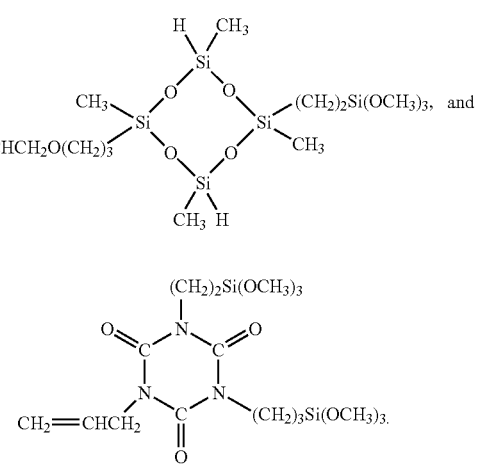
* * * * *